United States Patent [19]
Yamada et al.

[11] Patent Number: 5,508,834
[45] Date of Patent: Apr. 16, 1996

[54] LIQUID CRYSTAL DISPLAY DEVICE HAVING POLARIZERS AND MICROLENS ARRAYS ATTACHED TO TRANSPARENT COVER MEMBERS

[75] Inventors: Naoki Yamada; Keiji Kato, both of Kanagawa, Japan

[73] Assignee: Sony Corporation, Tokyo, Japan

[21] Appl. No.: 205,243

[22] Filed: Mar. 3, 1994

[30] Foreign Application Priority Data

Mar. 4, 1993 [JP] Japan .................................. 5-069464

[51] Int. Cl.⁶ .................................. G02F 1/1335
[52] U.S. Cl. .................. 359/83; 359/63; 359/67; 359/41
[58] Field of Search .................. 359/40, 41, 63, 359/83, 67, 81, 619

[56] References Cited

U.S. PATENT DOCUMENTS

| | | | |
|---|---|---|---|
| 3,874,163 | 4/1975 | Ikeno | 359/63 |
| 4,963,001 | 10/1990 | Miyajima | 359/41 |
| 5,018,837 | 5/1991 | McKee et al. | 359/63 |
| 5,126,863 | 6/1992 | Otsuka et al. | 359/83 |
| 5,150,231 | 9/1992 | Iwamoto et al. | 359/48 |
| 5,406,399 | 4/1995 | Koike | 359/83 |

FOREIGN PATENT DOCUMENTS

| | | | |
|---|---|---|---|
| 60-57820 | 4/1985 | Japan | 359/83 |
| 63-264720 | 11/1988 | Japan | 359/67 |
| 3-63626 | 3/1991 | Japan | 359/68 |

*Primary Examiner*—William L. Sikes
*Assistant Examiner*—Tai V. Duong
*Attorney, Agent, or Firm*—Hill, Steadman & Simpson

[57] ABSTRACT

To provide a liquid crystal display device which is free from any adverse affect due to foreign matter attached to a polarizing plate, the liquid crystal display device is provided with a liquid crystal cell, a pair of transparent cover members mounted on outer surfaces of the liquid crystal cell, and polarizing plates attached to the transparent cover members. The polarizing plates are attached to the surfaces of the transparent cover members while ensuring a sufficient space from a liquid crystal layer of the liquid crystal cell. Therefore, in the case where a focal plane of an enlargement lens system is aligned with the liquid crystal layer, the polarizing plates are located out of a depth of focus of the lens system to thereby obviate the adverse affect due to the foreign matter attached to the polarizing plates. In some cases, it is possible to integrally form a microlens array with the transparent cover member in confront with and in alignment with a pixel array. It is also possible to provide a light-shielding layer to the transparent cover members for shielding a non-effective image field region of the liquid crystal cell.

9 Claims, 6 Drawing Sheets

LIQUID CRYSTAL DISPLAY DEVICE HAVING POLARIZERS AND MICROLENS ARRAYS ATTACHED TO TRANSPARENT COVER MEMBERS

BACKGROUND OF THE INVENTION

The present invention relates to an outer peripheral structure for a liquid crystal display device, and more particularly to a system for attaching a polarizing plate to a liquid crystal cell.

Figure 1:
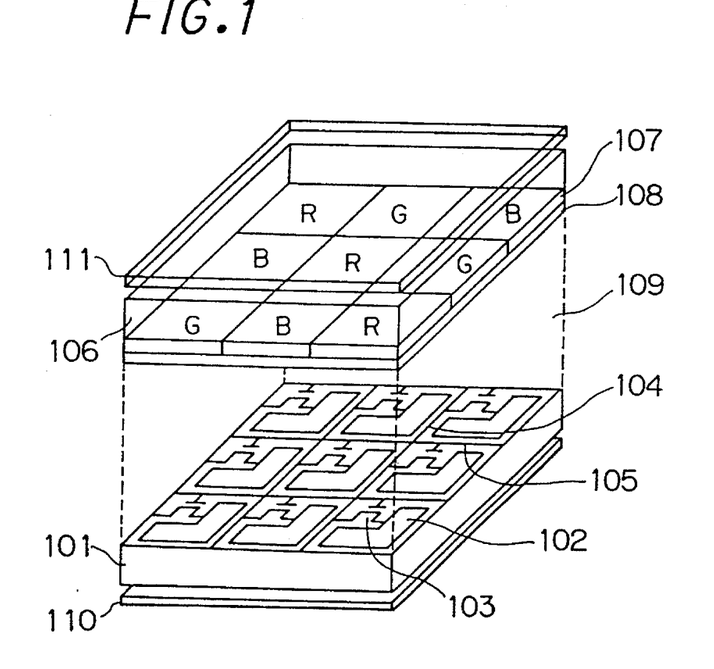
FIG. 1 is a schematic perspective view showing an example of a general structure of a conventional liquid crystal display device.

In order to clarify the background of the present invention, an example of a conventional liquid crystal display device will now be briefly explained with reference to FIG. 1. A pixel array in the form of a matrix is formed on one inner surface of a substrate 101. Each pixel is composed of a thin film transistor (TFT) for driving and a pixel electrode 102 formed by patterning a transparent conductive film. A drain electrode of each TFT is connected to the associated pixel electrode 102, a source electrode thereof is connected to a data line 104, and a gate electrode thereof is connected to a scan line 105. The substrate in which the TFTs and the like are thus formed in an integral manner will be referred to as a TFT substrate. Color filters (CF) 107 composed of RGB three-primary color segments and opposite electrodes 108 are laminated on one inner surface of the other substrate 106. The individual color filter segments are in alignment with the pixel. The substrate in which the color filters and the like are thus formed will be referred to as a CF substrate. A liquid crystal layer 109 is filled in a gap defined between the TFT substrate and the CF substrate 106. Polarizing plates 110 and 111 are attached directly to the outer surfaces of both the substrates 101 and 106, respectively. When the TFTs are electrically connected through the scan line 105 for every row, an image signal to be fed from the data line 104 is written in each pixel electrode 102. A voltage is applied between the pixel electrode 102 and the opposite electrode 108 in response to the stored image signal to thereby change a molecular arrangement of the liquid crystal layer 109. This change is picked up as a change in transmittivity to thereby bring about the image display. The liquid crystal display device having such a structure is referred to as an active matrix type LCD. It should be noted that a liquid crystal display device to which the present invention pertains is not limited to this type LCD and it should be understood that the LCD is shown by way of example.

Figure 2:
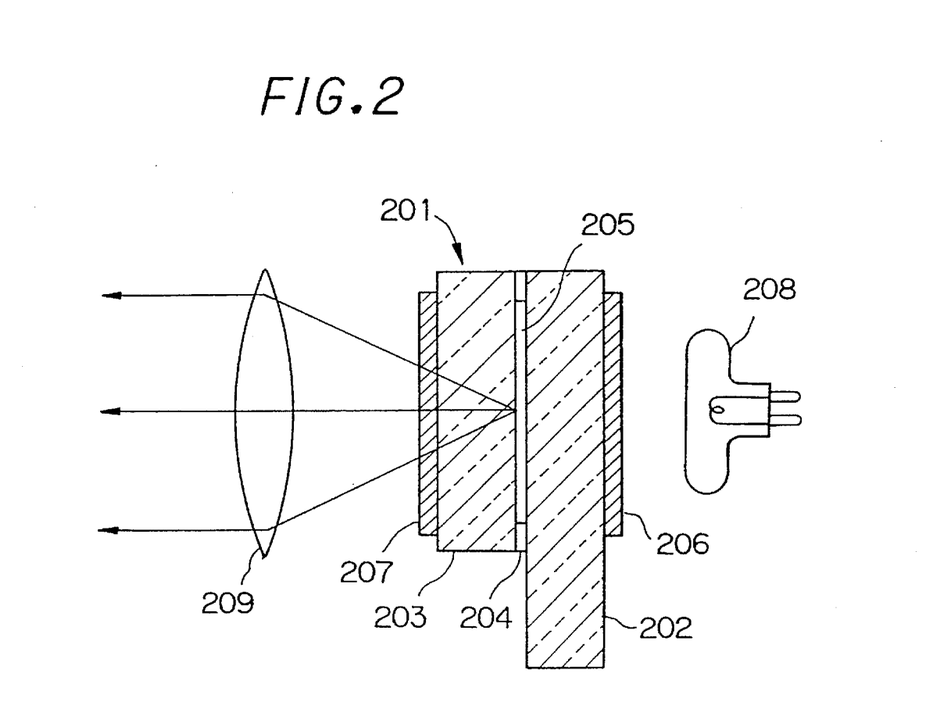
FIG. 2 is a schematic view illustrating a task inherent in a conventional liquid crystal display device.

A task to be solved by the present invention will now be briefly explained with reference to FIG. 2. A liquid crystal cell 201 has a structure in which a TFT substrate 202 and a CF substrate 203 are bonded together by a sealant 204 and a liquid crystal layer 205 is held in a gap between both the substrates. Respective polarizing plates 206 and 207 are attached directly to outer surfaces of the two substrates. The unit has a disadvantage such that, when a foreign matter such as dust or fluff is attached to the polarizing plates during bonding, a quality of the article would be deteriorated. In particular, it is impossible to remove the foreign matter entrained in the bonded interfaces between the polarizing plates and the substrates without as the polarizing plates being replaced by new ones. The deterioration in display quality due to the foreign matter would be remarkable in particular when the liquid crystal display device is applied to a viewfinder or a projector. In such an application, the illumination is achieved by a light source 208 located behind the liquid crystal cell 201 and at the same time, an image surface illuminated through an enlargement lens system 209 is enlarged and projected forwardly. In general, the focal plane of the enlargement lens system 209 is in alignment with the layer of the color filter formed in the CF substrate 203. However, in many cases, a thickness of each substrate is about 1 mm and is within a depth of focus of the enlargement lens system 209. As a result, the foreign matter attached to the interface between the substrate and the polarizing plate is also projected with a relatively clear outline or contour, thereby considerably degrading the image quality.

SUMMARY OF THE INVENTION

Accordingly, in view of the foregoing defects inherent to the conventional technique, an object of the present invention is to provide a panel structure in which an image quality would not be adversely affected even if the foreign matter such as dust or fluff is attached to the polarizing plates.

In order to attain this and other objects, according to the present invention, there is provided a liquid crystal display device comprising: a liquid crystal cell; a pair of transparent cover members each of which is mounted on to a periphery of said liquid crystal cell; and a pair of polarizers each of which is applied to an associated one of said transparent cover members so that said liquid crystal cell and at least one of said polarizers is spaced apart from each other.

At least one of said polarizers may be applied to a surface of one of said transparent cover members. At least one of said polarizers is applied to the inside of one of said transparent cover members. The liquid crystal cell has a pixel array and said transparent cover member has a microlens array so that each pixel of said pixel array is aligned with an associated microlens element of said microlens array. The liquid crystal cell has an effective image field region provided on a central portion of said liquid crystal cell and a non-effective image field region provided around said effective image field region, and a light-shielding layer is formed for selectively shielding said non-effective image field region.

According to another aspect of the invention, there is provided a liquid crystal display device comprising: a liquid crystal cell having a pixel array; and a transparent covering means, disposed on a periphery of said liquid crystal cell on ensure a space between said liquid crystal cell and said transparent covering means, said transparent covering means having a microlens array which faces said liquid crystal cell so that each pixel of said pixel array is aligned with each microlens element of said microlens array.

The transparent covering means may includes a pair of transparent cover members each of which is disposed on the periphery of said liquid crystal cell. The liquid crystal cell has an effective image field region provided on a central portion of said liquid crystal cell and a non-effective image field region provided around said effective image field region, and a light-shielding layer is formed for selectively shielding said non-effective image field region. The microlens array and said transparent covering means are assembled together to form a unitary support structure. The transparent covering means may include at least one transparent cover member having a polarizer on its surface. The transparent covering means may include at least one transparent cover member having positioning recesses in its outer surface.

According to the first aspect of the invention, the polarizer is located at a sufficient space away from the liquid crystal layer of the liquid crystal plate through the transparent cover member. Accordingly, even in the case where the image of the liquid crystal cell is projected through an enlargement lens system, foreign matter attached to the polarizer is located out of a depth of focus of the enlargement lens system. Accordingly, there is almost no fear that an image quality would deteriorate.

According to the second aspect of the invention, the microlens array is integrally formed with the transparent cover member. The microlens array is in alignment with the pixel array of the liquid crystal cell and the illumination light is converged in each pixel to enhance efficiency in utilization of light. In comparison with a conventional structure in which the microlens array is formed in the substrate itself, the integral molding is possible with a low cost in the case where the transparent cover members are used.

According to the third aspect of the invention, a light-shielding layer is formed to the transparent cover member so as to shield the non-effective image field region of the liquid crystal cell. It is unnecessary to provide a discrete part for the light-shielding or masking as in the conventional device. The positioning of the light-shields or masks relative to the liquid crystal cell is simply carried out with high precision.

BRIEF DESCRIPTION OF THE DRAWINGS

In the accompanying drawings:

FIGS. 9(A) and 9(B) are a schematic cross-sectional view and a schematic plan view showing a liquid crystal display device in accordance with a fourth embodiment of the invention.

DESCRIPTION OF THE PREFERRED EMBODIMENTS

Figure 5:
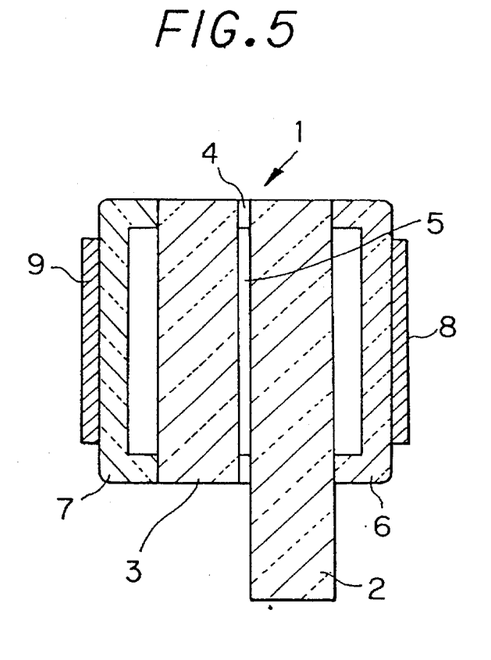
FIG. 5 is a schematic cross-sectional view showing a liquid crystal display device in accordance with a first embodiment of the invention.

A preferred embodiment of the present invention will now be described with reference to the accompanying drawings. FIG. 5 is a schematic cross-sectional view showing a liquid crystal display device in accordance with a first embodiment of the invention. The liquid crystal display device is of an active matrix type and a liquid crystal cell 1 is composed of a TFT substrate 2 and a CF substrate 3. Both the substrates are bonded together by a sealant 4, and a liquid crystal layer 5 is held in a gap therebetween. Incidentally, it is apparent that the application of the present invention is not limited only to the active matrix type liquid crystal display device but the invention may be applied to any other various structures such as a simple matrix type LCD. A pair of transparent cover members 6 and 7 are mounted on outer surfaces of the liquid crystal cell 1. Each of the transparent members is formed in a predetermined configuration. In the embodiment shown, the transparent members are substantially flat and provided with central recess portions and peripheral flank or flange portions which are in contact with the liquid crystal cell 1. Polarizing plates 8 and 9 are attached to the pair of transparent cover members and 7, respectively. In the embodiment shown, the polarizing plates are attached to the surfaces of the transparent cover members 6 and 7. The polarizing plates 8 and 9 are arranged at a sufficient interval from the liquid crystal cell 1 through the transparent cover members 6 and 7 unlike the conventional arrangement. Accordingly, when the liquid crystal display device is applied to a viewfinder or a projector, in the case where the focal plane of the enlargement lens system is in alignment with the liquid crystal layer 5, for example, even if the foreign matter such as dust or fluff is attached to the polarizing plates 8 and 9, there is no adverse effect to the image quality because the location of the foreign matter is out of the depth of focus of the enlargement lens system. Incidentally, the transparent cover members 6 and 7 may also serve as outer frames for the liquid crystal cell 1.

Figure 6:
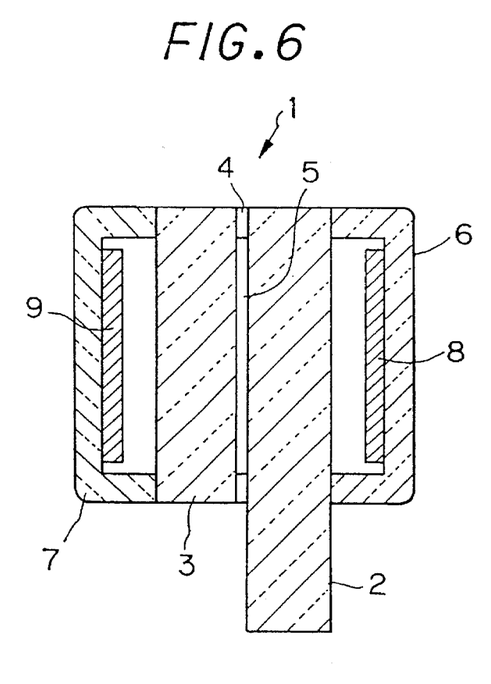
FIG. 6 is a schematic cross-sectional view showing a modification to the first embodiment.

FIG. 6 shows a modification to the first embodiment shown in FIG. 5. The structure shown in FIG. 6 is substantially the same as that of the first embodiment. The same reference numerals are used to indicate the like members or components for easily understanding them. The difference therebetween is that a pair of polarizing plates 8 and 9 are attached to a back surface of each transparent cover member 6, 7. Also in this case, a sufficient space is kept in the interior of each transparent cover member 6, 7. Even if the foreign matter is attached to the polarizing plate 8, 9, any adverse effect would not be applied to the image quality. Also, in this case, it is easier to clean up the foreign matter or the like attached to the surface of the transparent cover member 6, 7. The liquid crystal display device may more readily be handled in actual case.

Figure 7:
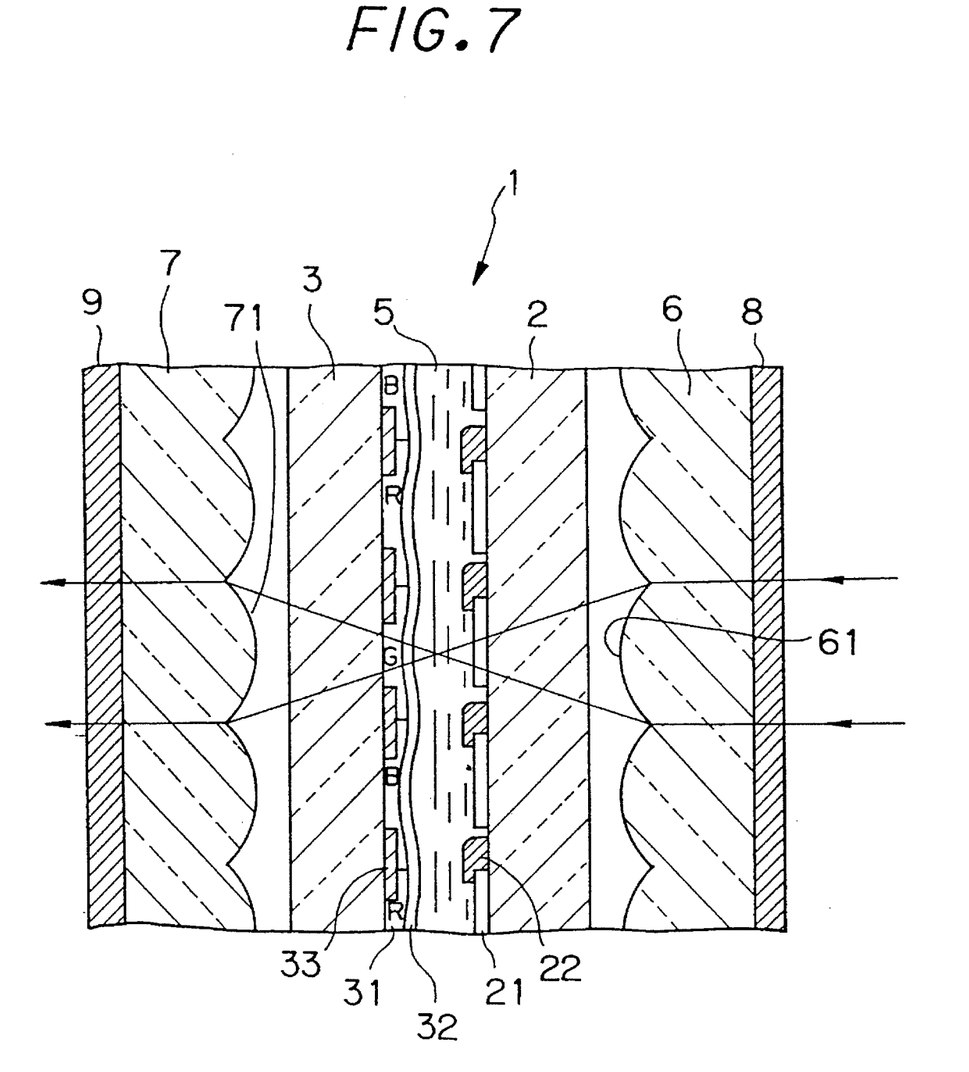
FIG. 7 is a partial cross-sectional view showing a liquid crystal display device in accordance with a second embodiment of the invention.

FIG. 7 is a schematic, partial cross-sectional view showing a liquid crystal display device according to a second embodiment of the invention. The structure of the second embodiment is essentially the same as that of the first embodiment shown in FIG. 5. The same reference numerals are used to indicate like members or components for easily understanding them. A number of pixel electrodes 21 arranged in the form of a matrix and a number of TFTs 22 for driving individual pixel electrodes 21 are formed on an inner surface of the TFT substrate 2 to form a pixel array. A number of color filters 31 and an opposite electrode 32 are laminated on an inner surface of the associated CF substrate 3. The color filters 31 are divided into RGB three-primary color segments corresponding to the pixel electrodes 21. A number of black masks 33 are formed for shielding the individual TFTs 22. Each part surrounded by the black masks constitutes a pixel opening.

The characterizing feature of this embodiment is that a microlens array is formed on the back surface of each transparent cover member 6, 7. The microlens array is in confront with and in alignment with the aforesaid pixel array. Namely, the microlenses 61 and 71 are arranged in correspondence with the respective pixels. The illumination light converged by the microlens 61 on the incident side selectively projects only the openings corresponding to the pixels, and thereafter advances through the microlens 71 on the emergent side 71. Such an arrangement is suitable to a liquid crystal projector or the like, and it is possible to improve substantial light-transmittivity to be contributable to an effective utilization of the illumination light. According to this embodiment, the microlens arrays are separated and located away from the liquid crystal cell 1, and are mounted on the liquid crystal cell in the later stage of the assembling process. Accordingly, in the manufacture stage, after the inspection of the liquid crystal cell 1 itself has been carried out, it is possible to apply the microlens arrays only to the passed unit. Accordingly, it is possible to perform an effective use of physical parts. Also, since the microlens arrays are mounted on the inner back surfaces of the transparent cover members, they are protected from the outside and are protected of the adverse effect of the foreign matter attached to the surfaces of the transparent cover members due to the structure. Also, it is possible to apply various kinds of materials such as plastic to the transparent cover members. For instance, in the case of use of moldable material such as plastic, it is possible to mold the microlens array integrally with the transparent cover member and to produce the microlens array at a low cost with high precision. It is not difficult to enhance a high precision in alignment between the microlens array and the pixel array, because, for example, it is possible to align the transparent cover members with the TFT substrate and the CF substrate by using overlap marks for the TFT and CF substrates. Furthermore, according to the invention, the microlens arrays may be provided on both sides of the TFT and CF substrates and the efficiency is improved twice over the case where the microlens array is provided only for one side. It is however possible to provide the microlens array only on one side.

Figure 3:
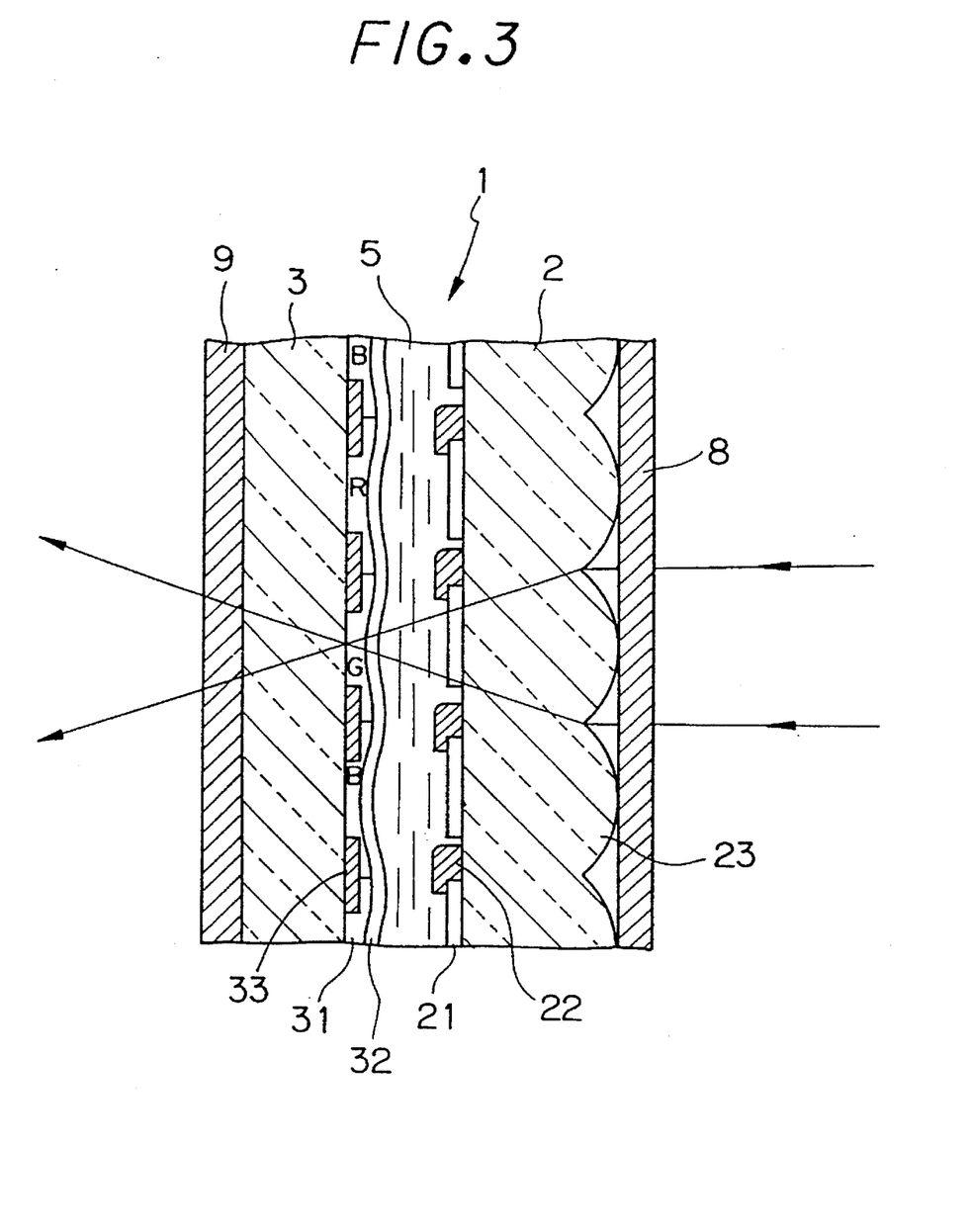
FIG. 3 is a partial cross-sectional view showing an example of a conventional liquid crystal display device.

FIG. 3 shows an example of a conventional structure for comparison. The same reference numerals are used to indicate the same members or components as in the second embodiment shown in FIG. 7. In the conventional structure, the microlens 23 is formed in, for example, an outer surface of the TFT substrate 2. Incidentally, the microlens may be formed in the CF substrate 3. In either case, since the TFT substrate or the CF substrate itself is formed to have a lens by etching or the like, the manufacture process is very complicated and needs a high technique. Also, the surface of the assembled liquid crystal cell 1 tends to collect foreign matter in valley portions of the microlens, and hence the handling of the liquid crystal cell 1 needs delicate cares. Accordingly, there is a disadvantage that faults would be likely to take place in actually assembling the liquid crystal display device. Also, since the microlens array has to be produced in accordance with the manufacture process for liquid crystal cell 1, in the case where it is found through the inspection in the final stage that the liquid crystal cell has a fault, the microlens array is wasted, which leads to a loss for the manufacture cost.

Figure 8:
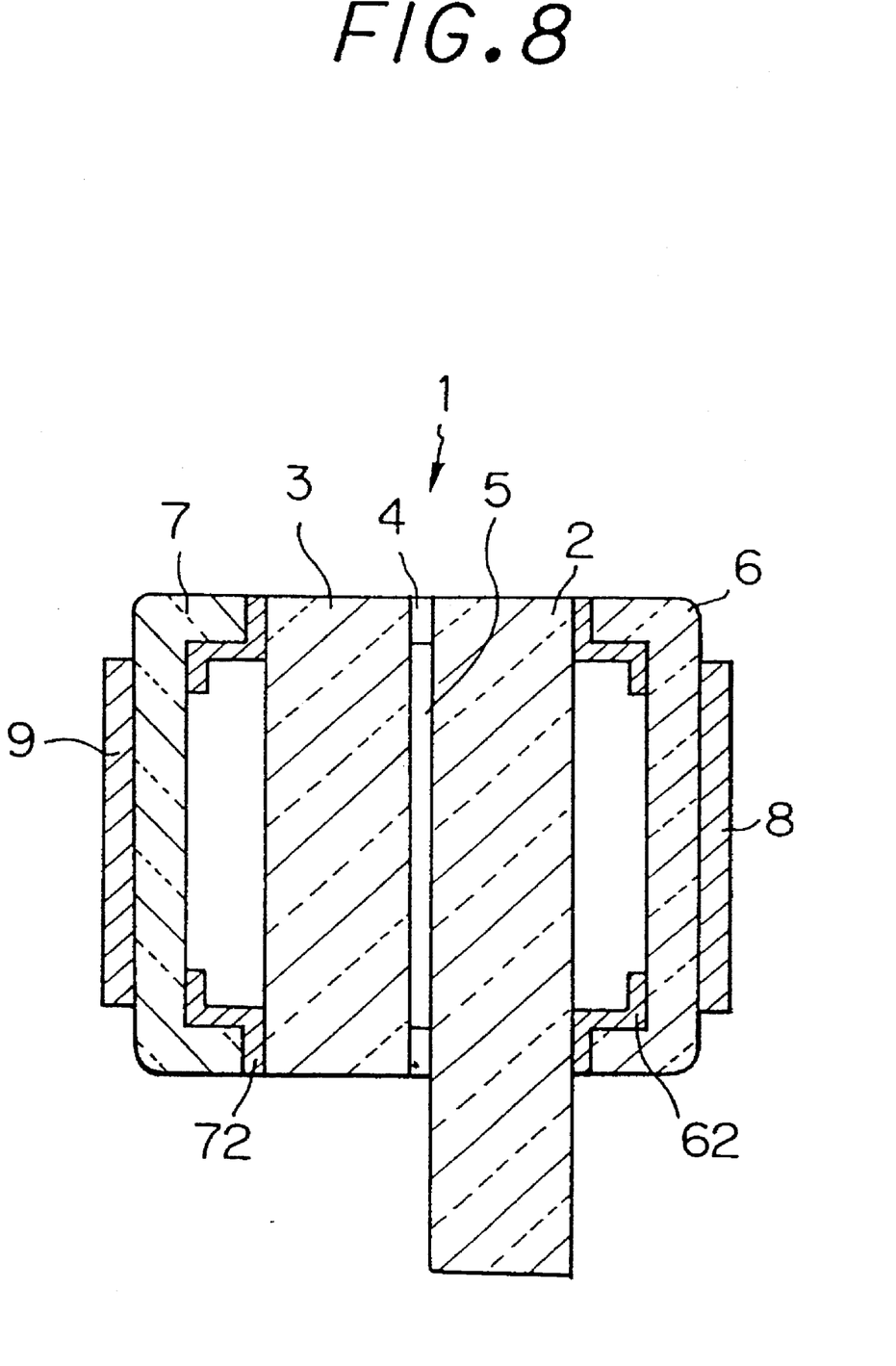
FIG. 8 is a schematic cross-sectional view showing a liquid crystal display device in accordance with a third embodiment of the invention.

FIG. 8 is a schematic cross-sectional view showing a liquid crystal display device in accordance with a third embodiment of the present invention. This embodiment has substantially the same structure as that of the first embodiment shown in FIG. 5. The same reference numerals are used to indicate like members or components. The characterizing feature of this embodiment is that light-shielding films 62 and 72 are formed in predetermined shapes on an inner back surfaces of the respective transparent cover members 6 and 7 through patterning. The light-shielding films 62 and 72 may be formed by, for example, either plating or painting. In this embodiment, the light-shielding films are formed on the back surfaces of the transparent cover members but may be formed only on the outer surfaces for some reason. The light-shielding films 62 and 72 are arranged so as to selectively shield only the non-effective image field region of the liquid crystal cell 1. The alignment between the light-shielding films and the non-effective image field regions is automatically carried out by simply positioning the transparent cover members 6 and 7 on the liquid crystal cell 1.

Figure 4:
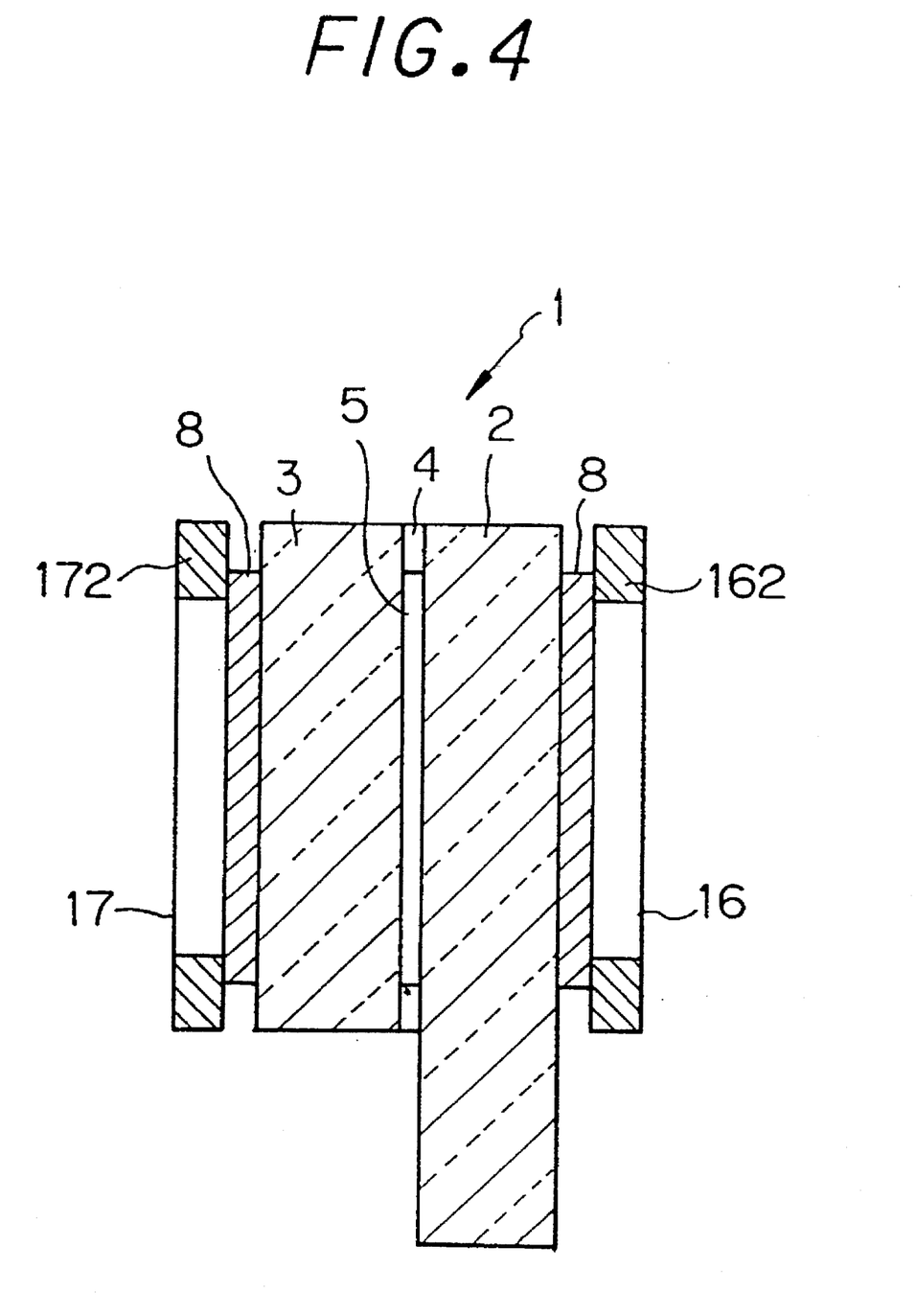
FIG. 4 is a cross-sectional view showing another example of a conventional liquid crystal display device.

FIG. 4 shows a conventional light-shielding structure for comparison. The same reference numerals are used to indicate the same components or members as those of the third embodiment shown in FIG. 8 for readily understanding the difference therebetween. Conventionally, in order to shield and shut out the non-effective image field regions of the liquid crystal cell 1, a pair of light-shielding plates 16 and 17 specialized for this purpose are used along the periphery of the liquid crystal cell 1. The light-shielding regions 162 and 172 in the form of frames are provided along the respective light-shielding plates 16 and 17. In this case, it is necessary to perform the alignment of the light-shielding plates 16 and 17 relative to the liquid crystal cell 1 with high precision, and the assembling work becomes complicated. Also, since it is necessary to provide the parts specialized only for the light-shielding or-masking, the number of the parts is increased.

FIG. 9(A) and 9(B) are a schematic cross-sectional view and a schematic plan view showing a liquid crystal display device in accordance with a fourth embodiment of the invention. This device has essentially the same structure as that of the first embodiment shown in FIG. 5. The same reference numerals are used to indicate the same components or members for easily understanding the difference therebetween. The characterizing feature of this embodiment is that the respective cover members 6 and 7 serve also as outer frames and have the configurations that are engageable with the outer end surfaces of the respective TFT substrate 2 and CF substrate 3. Positioning recesses 65 and 75 are formed at four corner portions of the outer surfaces of each of the transparent cover member 6, 7. A flexible cable 67 is connected to an exposed outer peripheral surface portion of the TFT substrate 2 for electric connection to the outside, thus constituting a module as a whole. Exposed glass surfaces of the TFT substrate 2 and the CF substrate 3 are surrounded as a whole by the transparent cover members 6 and 7 that serve as the outer frames so that any damage of the glass substrates may be prevented to thereby facilitate the handling of the unit. The positioning recesses 65 and 75 are provided so that the actual assembling work to a liquid crystal module may be simplified.

As described above, according to the present invention, the transparent cover member is mounted on a liquid crystal cell and the polarizing plate is attached to the transparent cover member. Accordingly, it is possible to ensure a sufficient space between the liquid crystal layer of the liquid crystal cell and the polarizing plate, so that the deterioration in image quality due to the attachment of the foreign matter to the polarizing plate may be suppressed advantageously. In addition, the transparent cover member is mounted on the liquid crystal cell, the microlens array is formed inside of the transparent cover member, and rays of light are converged to the pixel array to thereby essentially improve the light transmittivity. The transparent cover member is made of resin or the like so that the microlens array is moldable to thereby reduce the manufacture cost advantageously. Furthermore, the light-shielding films are formed out of the effective image field region of the transparent cover member to be mounted on the liquid crystal cell to thereby dispense with the light-shielding parts to reduce the number of the physical parts. Since the light-shielding films may be automatically positioned in place by mounting the transparent cover member on the liquid crystal cell, the easier assembling is advantageously possible.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A liquid crystal display device for use with a lens system with a depth of focus, said device including a liquid crystal cell; a pair of polarizer; and means for mounting the polarizers adjacent the cell and out of the depth of focus of the lens system so that foreign matter on the polarizers will not adversely effect the image quality, said means including a pair of transparent cover members, each cover member having a C-shaped cross section and including a planar portion with an upstanding peripheral flange, said peripheral flange engaging the periphery of the liquid crystal cell to space the planar portion from said cell, each cover member supporting one of the pair polarizers.

2. A liquid crystal display according to claim 1, wherein each polarizer is mounted on an interior surface of the planar portion of the cover member facing the liquid crystal cell.

3. A liquid crystal display according to claim 1, wherein the polarizers are mounted on an outer surface of the cover member.

4. The liquid crystal display device according to claim 3, wherein said liquid crystal cell has a pixel array and said transparent cover member has a microlens array so that each pixel of said pixel array is aligned with an associated microlens element of said microlens array.

5. The liquid crystal display device according to claim 1, wherein said liquid crystal cell has an effective image field region provided on a central portion of said liquid crystal cell and a non-effective image field region provided around said effective image field region, and a light-shielding layer is formed for selectively shielding said non-effective image field region.

6. A liquid crystal display device for use with a lens system with a depth of focus comprising a liquid crystal cell having a pixel array; a pair of polarizers; a pair of microlens arrays; and means for mounting the polarizers adjacent the surfaces of the cell and out of the depth of focus of the lens systems so that foreign matter on the polarizers will not adversely effect the image quality, said means including a pair of transparent cover members, each transparent cover member having a C-shaped cross section and including a planar portion with an upstanding peripheral flange engaging a periphery of the liquid crystal cell to space the planar portion from the cell, each cover member supporting one of the microlens arrays facing the liquid crystal cell so that each pixel of the pixel array is aligned with each microlens element of said microlens array and having a polarizer disposed on an outer surface of the planar portion of the cover member.

7. A liquid crystal display according to claim 6, wherein the liquid crystal cell has an effective image field region provided on a central portion of said liquid crystal cell and a non-effective image field region provided around said effective image field region, and each of said cover members including a light-shielding layer being formed for selectively shielding said non-effective image field regions.

8. The liquid crystal display device according to claim 6, wherein said micro lens array and said transparent cover member are assembled together to form a unitary support structure.

9. The liquid crystal display device according to claim 6, wherein at least one of said transparent cover members comprises positioning recesses in its outer surface.

* * * * *